United States Patent
Chen et al.

(10) Patent No.: US 10,042,224 B2
(45) Date of Patent: Aug. 7, 2018

(54) TOUCH DISPLAY PANEL AND TOUCH DISPLAY DEVICE USING THE SAME

(71) Applicant: InnoLux Corporation, Miao-Li County (TW)

(72) Inventors: Miao-Ting Chen, Miao-Li County (TW); Hsi-Chien Chen, Miao-Li County (TW); Huei-Ying Chen, Miao-Li County (TW); Hsing-Yuan Hsu, Miao-Li County (TW); I-An Yao, Miao-Li County (TW); Po-Yang Chen, Miao-Li County (TW); Kuo-Jung Wu, Miao-Li County (TW); Chen-Wei Chi, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 161 days.

(21) Appl. No.: 15/158,633

(22) Filed: May 19, 2016

(65) Prior Publication Data

US 2016/0357079 A1    Dec. 8, 2016

Related U.S. Application Data

(60) Provisional application No. 62/171,592, filed on Jun. 5, 2015, provisional application No. 62/188,088, filed on Jul. 2, 2015.

(30) Foreign Application Priority Data

Oct. 12, 2015 (TW) .............................. 104133353 A

(51) Int. Cl.
*G02F 1/1362* (2006.01)
*G06F 3/041* (2006.01)
*G02F 1/1333* (2006.01)
*F21V 8/00* (2006.01)

(52) U.S. Cl.
CPC ..... *G02F 1/136204* (2013.01); *G02B 6/0088* (2013.01); *G02F 1/13338* (2013.01); *G06F 3/0412* (2013.01); *G02F 2202/22* (2013.01)

(58) Field of Classification Search
CPC ........... G02F 1/13338; G02F 1/136204; G02F 2202/22; G02F 1/133514; G02F 1/133528; G06F 3/0412; G06F 2203/04107; G02B 6/0088; H01L 23/60
See application file for complete search history.

(56) References Cited

U.S. PATENT DOCUMENTS

| | | | |
|---|---|---|---|
| 9,141,224 B1* | 9/2015 | Rowe | G06F 3/0414 |
| 2016/0103531 A1* | 4/2016 | Kimura | G02F 1/13338 345/174 |
| 2017/0199592 A1* | 7/2017 | Chien | G06F 1/1601 |

* cited by examiner

*Primary Examiner* — Huyen Ngo
(74) *Attorney, Agent, or Firm* — McClure, Qualey & Rodack, LLP

(57) ABSTRACT

The present disclosure provides a touch display panel, comprising: a first substrate; a second substrate disposed opposite to the first substrate; a display medium layer disposed between the first substrate and the second substrate; a sensing electrode layer disposed on the first substrate; and an electrostatic releasing layer disposed on the second substrate, and a sheet resistance of the electrostatic releasing layer is $10^9$-$10^{12}\Omega/\square$. The present disclosure also discloses a touch display device using the said touch display panel.

17 Claims, 6 Drawing Sheets

TOUCH DISPLAY PANEL AND TOUCH DISPLAY DEVICE USING THE SAME

CROSS REFERENCE TO RELATED APPLICATION

This application claims the benefit of the filing date of U.S. Provisional Application Ser. No. 62/171,592, entitled "AAS TOP-COM OF IN CELL TOUCH STRUCTURE WITH HIGH RESOLUTION" filed on Jun. 5, 2015 under 35 USC § 119(e)(1).

This application claims the benefit of the filing date of U.S. Provisional Application Ser. No. 62/188,088, entitled "SELF-TYPE IN-CELL TOUCH PANEL WITH GATE DRIVER ON PANEL (GOP) AND SHIELDING LAYER DESIGN" filed on Jul. 2, 2015 under 35 USC § 119(e)(1).

This application claims the benefits of the Taiwan Patent Application Serial Number 104133353, filed on Oct. 12, 2015, which also claims the benefits of the filing dates of U.S. Provisional Application Ser. No. 62/171,592 filed on Jun. 5, 2015 and Ser. No. 62/188,088 filed on Jul. 2, 2015, the subject matter of which is incorporated herein by reference.

BACKGROUND OF THE INVENTION

1. Field of the Invention

The present disclosure relates to a touch display panel and a touch display device. More particularly, the present disclosure relates to a touch display panel having electrostatic releasing function and a touch display device using the said touch display panel.

2. Description of Related Art

As technology advances, operation of all types of electronic equipments has become more intuitive and more user friendly. In particular, the control of all types of electronic equipments by touch technology is currently the most widely used mode of operation. As a result, touch display devices are currently the most intuitive and most user friendly operation interface of input. This type of equipments can be used intuitively by users of all ages using finger or stylus directly.

For touch display devices known in current market, since there is no design for electrostatic releasing, touch display devices are prone to be affected by electrostatic charges of external environment. If the electrostatic charges accumulated on touch panels cannot be removed timely, the electric field generated may affect the function of display medium layer, such as a liquid crystal layer. Consequently, touch display devices will become insensitive and sometimes even uncontrollable.

Accordingly, there is a need to develop a touch display device in which electrostatic charges accumulated on a touch panel can be timely released.

SUMMARY OF THE INVENTION

The present disclosure provides a touch display panel in which the electrostatic charges accumulated thereon can be released by an electrostatic releasing layer. As a result, the function of display medium layer being affected by the electric field generated by external electrostatic charges can be prevented. Consequently, the sensitivity and accuracy of devices can be improved and product yield can be increased.

Specifically, the present disclosure provides a touch display panel, comprising: a first substrate; a second substrate disposed opposite to the first substrate; a display medium layer disposed between the first substrate and the second substrate; a sensing electrode layer disposed on the first substrate; a grounding unit disposed on the first substrate; and an electrostatic releasing layer disposed on the second substrate and electrically connected to the grounding unit, and a sheet resistance of the electrostatic releasing layer is $10^9$-$10^{12}\Omega/\square$.

In addition, the present disclosure further provides a touch display device, comprising: a backlight module, wherein the backlight module includes a metal frame body, a light guide plate, and an optical film set, the metal frame body has an accommodating portion, the light guide plate is disposed in the accommodating portion and has a light exiting surface, and the optical film set is disposed in the accommodating portion and on the light exiting surface of the light guide plate; and a touch display panel disposed on the backlight module, wherein the touch display panel includes a first substrate, a second substrate, a sensing electrode layer, a display medium layer, and a electrostatic releasing layer, the second substrate is disposed opposite to the first substrate, the sensing electrode layer and the display medium layer are disposed between the first substrate and the second substrate, and the electrostatic releasing layer is disposed on the second substrate and a sheet resistance of the electrostatic releasing layer is $10^9$-$10^{12}\Omega/\square$. The metal frame body electrically connects to the electrostatic releasing layer.

Moreover, the present disclosure further provides a touch display device, comprising: a metal housing having an accommodating space; a backlight module disposed in the accommodating space; and a touch display panel disposed in the accommodating space and on the backlight module, wherein the touch display panel includes a first substrate, a second substrate, a sensing electrode layer, a display medium layer, and a electrostatic releasing layer, the second substrate is disposed opposite to the first substrate, the sensing electrode layer and the display medium layer are disposed between the first substrate and the second substrate, and the electrostatic releasing layer is disposed on the second substrate and a sheet resistance of the electrostatic releasing layer is $10^9$-$10^{12}\Omega/\square$. The metal housing electrically connects to the electrostatic releasing layer.

The aforesaid backlight module includes a frame body, a light guide plate, and an optical film set, the frame body has an accommodating portion, the light guide plate is disposed in the accommodating portion and has a light exiting surface, and the optical film set is disposed in the accommodating portion and on the light exiting surface of the light guide plate.

Accordingly; in the touch display panels and the touch display devices of the present disclosure, the electrostatic charges accumulated on touch panels can be removed by disposing an electrostatic releasing layer having a specific range of sheet resistances. The sensitivity and accuracy of the control of touch display devices comprising the said touch display panel can then be maintained. The present disclosure is suitable for any touch display panels and any touch display devices.

DETAILED DESCRIPTION OF THE PREFERRED EMBODIMENT

Figure 1A:
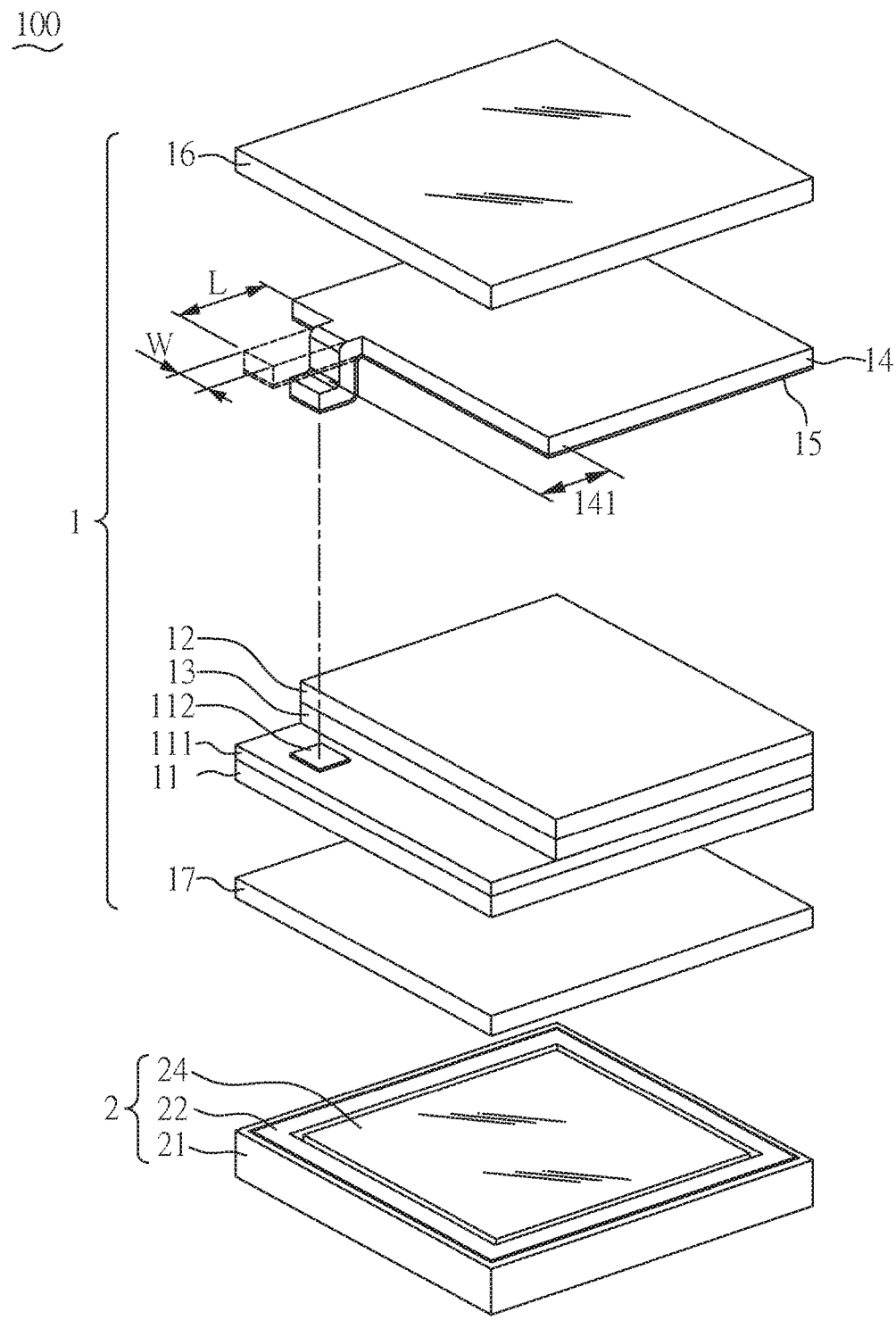
FIG. 1A is a three-dimensional schematic diagram of a touch display device of an embodiment of the present disclosure.

In the touch display panels of the present disclosure, every module, element, configuration, and the combination thereof can be increased, decreased, modified, or adjusted according to the needs of the person having ordinary skill in the art. The present disclosure is not limited thereto.

In addition, terms such as "first" and "second" in the specification and claims are only intended to make clear distinction of elements with the same name. These terms do not mean these elements are used or manufactured in any sequence.

In one embodiment of the present disclosure, the touch display panel may further comprise a first polarizer disposed on the second substrate, and the electrostatic releasing layer is disposed on at least one surface of the first polarizer.

In one embodiment of the present disclosure, the touch display panel may further comprise a cover glass disposed on the second substrate, and the electrostatic releasing layer and the first polarizer are disposed between the second substrate and the cover glass.

In one embodiment of the present disclosure, the aforesaid first polarizer may have a protruding portion connected to the grounding unit.

In one embodiment of the present disclosure, the sensing electrode layer of the touch display panel may include a common electrode disposed on the first electrode and electrically connected to the grounding unit.

In one embodiment of the present disclosure, the touch display panel may further comprise a flip-chip on film disposed on the first substrate and electrically connected to the common electrode, and the grounding unit is disposed on the flip-chip on film.

In one embodiment of the present disclosure, the touch display panel may further comprise a printed circuit board, wherein the flexible printed circuit is electrically connected to the printed circuit board and the grounding unit is disposed on the printed circuit board.

In one embodiment of the present disclosure, the electrostatic releasing layer of the touch display panel comprises conductive polymer, transparent conductive oxide, metal, carbon nanotube, graphene, or a combination thereof.

In one embodiment of the present disclosure, the touch display panel may further comprise a second polarizer disposed on the first substrate.

In the present disclosure, as long as the electrostatic releasing layer is disposed on the second substrate, the location where the electrostatic releasing layer is disposed is not particularly limited. For example, the electrostatic releasing layer may be disposed in between the second substrate and the display medium layer. The electrostatic releasing layer may be disposed in between the second substrate and the first polarizer. The electrostatic releasing layer may be disposed in between the first polarizer and the cover glass. Moreover, more than one electrostatic releasing layer may be disposed on the display medium layer. The electrostatic releasing layers may be stacked adjacently to each other or may be disposed on each of the aforesaid locations separately. The present disclosure is not particularly limited thereto. Furthermore, as described above, when the sheet resistance of the electrostatic releasing layer is in the range from $10^9 \Omega/\square$ to $10^{12} \Omega/\square$, the following can be prevented. For example, accumulation of external electrostatic charges on panels, generation of an electric field by these external electrostatic charges, interference of display medium by the electric field, and interference of the sensitivity and accuracy of the touch controls of devices can be prevented. In the present disclosure, when the sheet resistance is less than $10^9 \Omega/\square$, the sensitivity of touch panels may be interfered and affected. When the sheet resistance is greater than $10^{12} \Omega/\square$, the protective effect of electrostatic discharge (ESD) may not be achieved. Thus, the sheet resistance of the electrostatic releasing layer is preferably in the range from $10^9 \Omega/\square$ to $10^{12} \Omega/\square$.

In the present disclosure, the unit, $\Omega/\square$, of the sheet resistance refers to ohmic value per unit area, which may also be ohm/sq.

In the present disclosure, as described above, as long as the sheet resistance of the electrostatic releasing layer is in the aforesaid range, the electrostatic releasing layer may be manufactured using any materials. The present disclosure is not particularly limited thereto. As listed above, the electrostatic releasing layer may comprise conductive polymer, transparent conductive oxide, metal, carbon nanotube, graphene, or a combination thereof. More specifically, the conductive polymer may be poly(3,4-ethylenedioxythiophene):poly(styrenesulfonate) (PEDOT:PSS), polyaniline (PANI), polyacetylene (PAc), polypyrrole, poly(thiophene)s (PT), poly(p-phenylene vinylene (PPV), polyfluorene (PFE), polyphenylene, poly(p-phenylene sulfide) (PPS), or other polymers with conductive properties. The transparent conductive oxide may be ITO, IZO, $In_2O_3$, $SnO_2$, ZnO, CdO, AZO, ATO, or other transparent conductive oxides. The metal may be all kinds of metal nanoparticles, nano-silks, or nano-threads, such as silver nanoparticles, gold nanoparticles, silver nano-silks, etc.

In the present disclosure, as long as the electrostatic releasing layer with a sheet resistance in the aforesaid range can be disposed in the touch display panel without affecting the functions of other elements, any known methods may be used to dispose the electrostatic releasing layer. The person having ordinary skill in the art may use any known methods to dispose the electrostatic releasing layer according to the materials and the conditions of the overall manufacturing process used to manufacture the electrostatic releasing layer. The present disclosure is not particularly limited thereto. For example, when conductive polymer is used as the material to manufacture the electrostatic releasing layer, the conductive polymer may be heated to melt or may dissolve in an appropriate solvent. Any coating methods suitable for polymer may then be used to manufacture the electrostatic releasing layer, such as dip coating, spin coating, roll coating, blade coating, spray coating, etc. However, the present disclosure is not limited thereto. When inorganic materials, such as transparent conductive oxide, metal, carbon nanotube, graphene, are used, known plating techniques may be used to manufacture the electrostatic releasing layer. For example, vapor deposition, sputtering, ion beam deposition, etc. Alternatively, these inorganic materials may also be dispersed in an appropriate solvent. Any of the aforesaid coating methods, such as spray coating, may then be used to manufacture the electrostatic releasing layer. However, the present disclosure is not limited thereto. The aforesaid appropriate solvents may comprise water; alcohol, such as methanol, ethanol, isopropanol; ether, such as methyl tert-butyl ether; a combination thereof; or other appropriate organic or inorganic solvents, such as n-heptane, cyclohexane, ethyl acetate. However, the present disclosure is not limited thereto. In addition, the preparation method and parameters used also depend on the conditions of the manufacturing process of the electrostatic releasing layer. For example, when the electrostatic releasing layer is to form directly on one of the elements of the touch display panel (i.e. the second substrate, the first polarizer, the cover glass, etc.), the preparation method used cannot damage the properties of the elements. For example, when the electrostatic releasing layer is to form directly on the first polarizer, the preparation method shall preferably includes dip coating, spin coating, roll coating, blade coating, or spray coating depending on the property of the polymer material of the first polarizer. When the electrostatic releasing layer is to form directly on the cover glass, coating methods or plating methods may be used. The electrostatic releasing layer may also be formed first and then dispose in the touch display panel. For example, the aforesaid appropriate coating methods or plating methods may be used to form the electrostatic releasing layer on a glass substrate or a release film first. The electrostatic releasing layer formed may then be transferred to the touch display panel. However, the present application is not limited thereto.

As described above, the electrostatic releasing layer may be electrically connected to the grounding unit or to any elements that can release electrostatic charges (i.e., metal housings or metal bezels) of the touch display panel using any methods. Electrical connection may be done using materials with conductive properties, such as conductive wires, conductive tapes, conductive gels, etc. Alternatively, if the electrostatic releasing layer has stickiness, the electrostatic releasing layer may also be used for electrical connection. For example, the electrostatic releasing layer may be coated on one surface or two surfaces of a first polarizer with a protruding portion using the aforesaid coating methods. The electrostatic releasing layer on the protruding portion is then electrically connected to a grounding unit to achieve the protective effect of ESD. In this case, the polarizing portion of the first polarizer may be disposed on the second substrate. The protruding portion may be disposed at the periphery of the polarizing portion. The polarizing portion and the protruding portion may be formed integrally as one piece.

In the preset disclosure, the first polarizer may comprise more than one protruding portion. The person having ordinary skill in the art may adjust the length and width of the protruding portion according to the requirements of devices. For example, a length of the protruding portion may be 0.3 mm to 12 mm. A width of the protruding portion may be 0.3 mm to 12 mm. However, the present disclosure is not particularly limited thereto.

In the present disclosure, the conductive wires may be electric wires, enameled wires, or other known conductive materials. The conductive tapes may be tapes having conductive materials such as copper foil or aluminum foil. The conductive gels may be any gels having particles of conductive materials (i.e. gold, silver, copper, or aluminum, etc.).

In the present disclosure, the display medium layer may comprise any possible display mediums, such as liquid crystals (LC), light emitting diode (LED), organic light-emitting diode (OLED), etc. The person having ordinary skill in the art may select appropriate display mediums according to the requirement of display panels. The present disclosure is not particularly limited thereto.

In the present disclosure, the first substrate and the second substrate may be any substrates of known display panels, such as a thin film transistor substrate or a color filter substrate, etc. The substrates may be manufactured using any known materials (such as polymer or glass, etc.) and any known methods.

In the present disclosure, the flexible printed circuit may be any known flexible printed circuits used in display devices. As long as the flexible printed circuit has a grounding portion that can be electrically connected to the electrostatic releasing layer, its material and structure are not particularly limited. Moreover, the connection method of the flexible printed circuit and the sensing electrode layer is not limited. Any known connection methods may be used. Similarly, the printed circuit board may also be any known printed circuit boards used in display devices. As long as the printed circuit board has a grounding portion that can be electrically connected to the electrostatic releasing layer, its material and structure are not particularly limited. Furthermore, the correspondence among the locations of the sensing electrode layer, the flexible printed circuit, and the printed circuit board may also be connected using any known methods. For example, the grounding portion of the flexible printed circuit may be electrically connected to the grounding portion of the sensing electrode layer correspondingly. Alternatively, the grounding portion of the flexible printed circuit may also be electrically connected to other connection pads of the sensing electrode layer correspondingly first. The grounding portion of the flexible printed circuit is then electrically connected to the grounding portion of the sensing electrode layer through a wire or a circuit. However, the present disclosure is also not particularly limited thereto.

In the present disclosure, the frame body used to accommodate elements such as the light guide plate or the housing used to accommodate the backlight module or the touch display panel may be metal products. In this case, by electrically connecting the electrostatic releasing layer to the metal frame body or the metal housing, the accumulated electrostatic charges can be released. For example, the frame body or the housing may be manufactured using aluminum, iron, magnesium, an alloy thereof, or a combination thereof. However, as long as the frame body or the housing can be electrically connected to the electrostatic releasing layer to release the accumulated electrostatic charges, the compositions of the frame body and the housing are not particularly limited in the present disclosure.

Hereinafter, the present disclosure will be described using the following specific embodiments. The person having ordinary skill in the art can easily understand other effects and novel features of the present disclosure from the content of this specification. The present disclosure may be implemented or applied using other different specific embodiments. Any modifications or changes may be executed without departing from the spirit of the present disclosure.

Embodiment 1

Figure 1B:
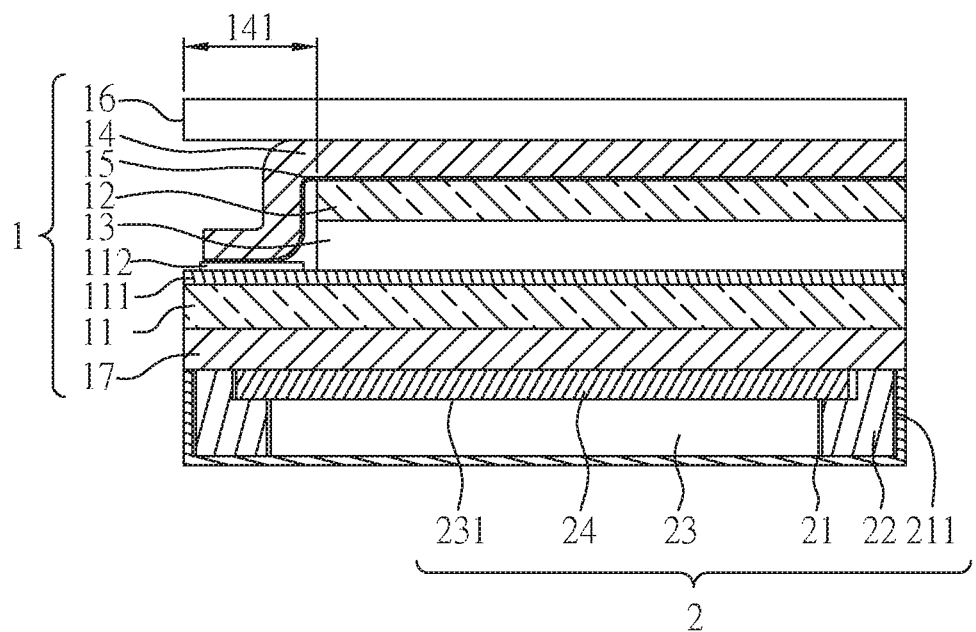
FIG. 1B is a schematic diagram showing a side view of a touch display device of an embodiment of the present disclosure.

Please refer to both FIGS. 1A and 1B. FIG. 1A is a three-dimensional schematic diagram of a touch display device 100 of Embodiment 1 of the present disclosure. FIG. 1B is a schematic diagram showing a side view of a touch display device 100 of Embodiment 1 of the present disclosure. The touch display device 100 comprises a touch display panel 1 and a backlight module 2. The touch display panel 1 is disposed on the backlight module 2. The touch display panel 1 of Embodiment 1 comprises: a first substrate 11; a second substrate 12 disposed opposite to the first substrate 11; a display medium layer 13 disposed between the first substrate 11 and the second substrate 12, and it is a liquid crystal layer; a sensing electrode layer 111 disposed on the first substrate 11, and the sensing electrode layer 111 comprises a common electrode (not shown) and a pixel electrode (not shown); a grounding unit 112 disposed on the first substrate 11 and electrically connected to the common electrode; a first polarizer 14 disposed on the second substrate 12 and comprises a protruding portion 141 connected to the grounding unit 112; an electrostatic releasing layer 15 disposed on a surface of the first polarizer 14 facing the second substrate 12, and a sheet resistance of the electrostatic releasing layer 15 is $10^9$-$10^{12}\Omega/\square$; a cover glass 16 disposed on the second substrate 12, and the first polarizer 14 and the electrostatic releasing layer 15 are disposed between the cover glass 16 and the second substrate 12; and a second polarizer 17 disposed on the first substrate 11. The backlight module 2 of Embodiment 1 comprises: a frame body 21, a plurality of frame strips 22, a light guide plate 23, and an optical film set 24. The frame body 21 has an accommodating portion 211. The frame strips 22 are disposed along and surround sides of the accommodating portion 211. The light guide plate 23 is disposed in the accommodating portion 211 and has a light exiting surface 231. The optical film set 24 is disposed in the accommodating portion 211 and on the light exiting surface 231 of the light guide plate 23.

In Embodiment 1, the first substrate 11 may be any known substrate materials, such as glass or plastic. The sensing electrode layer 111 may be any known electrode materials used in display panels, such as the aforesaid transparent conductive oxide films (i.e. indium tin oxide, etc.). However, the present disclosure is not particularly limited thereto.

In Embodiment 1, the first polarizer 14 and its protruding portion 141 is a one-piece structure. The electrostatic releasing layer 15 is disposed on the entire surface of the first polarizer 14 and the protruding portion 141. As shown in FIGS. 1A and 1B, a portion of the electrostatic releasing layer 15 is interposed between the first polarizer 14 and the second substrate 12. At least one portion of the electrostatic releasing layer 15 on the protruding portion 141 abuts both the protruding portion 141 and the grounding unit 112. The electrostatic charges accumulated on the first polarizer 14 are then released.

In Embodiment 1, since the electrostatic releasing layer 15 has stickiness, the electrostatic releasing layer 15 is electrically connected to the grounding unit 112 directly. In the present disclosure, the shape of the protruding portion 141 is not particularly limited. The person having ordinary skill in the art may use or design the protruding portion 141 in any shapes according to different needs. The present disclosure is not particularly limited thereto. Preferably, in Embodiment 1, the shape of the protruding portion 141 may be a long strip. The length of the protruding portion 141 is the length protruded from the first polarizer 14. The length of the protruding portion 141 may be moderately adjusted by the person having ordinary skill in the art according to different needs while considering the thicknesses of the display medium layer 13 and that of the second substrate 12. This is to prevent the protruding portion 141 from being overly protruded and to prevent the protruding portion 141 from being inadequately electrically connected to the grounding unit 112. Preferably, in Embodiment 1, a length L of the protruding portion 141 may be 0.3 mm to 12 mm. The width of the protruding portion 141 may also be adjusted according to different needs. The present disclosure is also not limited thereto. Preferably, in Embodiment 1, a width W of the protruding portion 141 may be 0.3 mm to 12 mm.

In Embodiment 1, the electrostatic releasing layer 15 may be manufactured by coating a solution comprising conductive polymer (i.e. PEDOT:PSS) or a solution comprising the aforesaid inorganic materials (i.e. ITO, IZO, ATO, silver nano-silk, carbon nanotube, graphene, and the like) on one surface of the first polarizer 14 using spray coating or blade coating followed by drying.

In Embodiment 1, the cover glass 16 may be attached onto the first polarizer 14 using an optical adhesive. However, the cover glass 16 may also be disposed using other known methods, such as edge lamination. The present disclosure is not limited thereto.

Accordingly, in Embodiment 1, the touch display device 100 comprises an electrostatic releasing layer 15 having a sheet resistance in a range from $10^9$ to $10^{12}\Omega/\square$ being electrically connected to a grounding unit 112. As a result, the accumulated electrostatic charges can then be released using the electrostatic releasing layer 15. The sensitivity and accuracy of the touch control of the device can then be improved. Since the first polarizer 14 includes a protruding portion 141 and the electrostatic releasing layer 15 has stickiness; thus, the electrostatic releasing layer 15 can be electrically connected to the grounding unit 112 on the first substrate 11 directly. No additional manufacturing processes and elements are used to electrically connect the electrostatic releasing layer 15 to the grounding unit 112. Consequently, the manufacturing process of the touch display panel can be overall simplified. Product yield can then be increased.

Embodiment 2

Figure 2A:
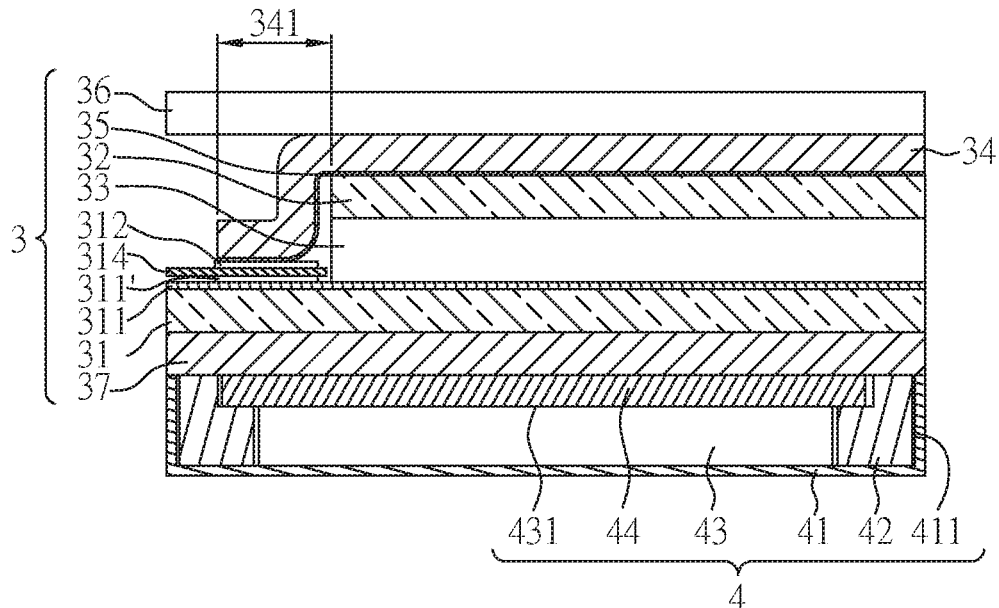
FIG. 2A is a schematic diagram showing a side view of a touch display device of an embodiment of the present disclosure.

Please refer to FIG. 2A. FIG. 2A is a schematic diagram showing a side view of a touch display device 200 of Embodiment 2 of the present disclosure. Embodiment 2 is similar to Embodiment 1 in general. As shown in FIG. 2A, the difference is that the touch display panel 3 of Embodiment 2 further comprises a flexible printed circuit 314. Specifically, the flexible printed circuit 314 is disposed on the first substrate 31. The flexible printed circuit 314 is electrically connected to the common electrode (not shown) of the sensing electrode layer 311 through a connecting pad 311'. The grounding unit 312 is disposed on the flexible printed circuit 314.

As shown in FIG. 2A, the touch display device 200 of Embodiment 2 comprises a touch display panel 3 and a backlight module 4. The touch display panel 3 is disposed on the backlight module 4. The touch display panel 3 of Embodiment 2 comprises: a first substrate 31; a second substrate 32 disposed opposite to the first substrate 31; a display medium layer 33 disposed between the first substrate 31 and the second substrate 32, and it is a liquid crystal layer; a sensing electrode layer 311 disposed on the first substrate 31, and the sensing electrode layer 311 comprises a common electrode (not shown) and a pixel electrode (not shown); a flexible printed circuit 314 disposed on the first substrate 31, and the flexible printed circuit 314 is electrically connected the common electrode through a connecting pad 311'; a grounding unit 312 disposed on the flip chip-on film 314; a first polarizer 34 disposed on the second substrate 32 and comprises a protruding portion 341 connected to the grounding unit 312; an electrostatic releasing layer 35 disposed on a surface of the first polarizer 34 facing the second substrate 32, and a sheet resistance of the electrostatic releasing layer 35 is $10^9$-$10^{12}\Omega/\square$; a cover glass 36 disposed on the second substrate 32, and the first polarizer 34 and the electrostatic releasing layer 35 are disposed between the cover glass 36 and the second substrate 32; and a second polarizer 37 disposed on the first substrate 31. A portion of the electrostatic releasing layer 35 is interposed between the first polarizer 34 and the second substrate 32. At least one portion of the electrostatic releasing layer 35 on the protruding portion 341 abuts both the protruding portion 341 and the grounding unit 312. Similar to Embodiment 1, the backlight module 4 of Embodiment 2 comprises: a frame body 41, a plurality of frame strips 42, a light guide plate 43, and an optical film set 44. The frame body 41 has an accommodating portion 411. The frame strips 42 are disposed along and surround sides of the accommodating portion 411. The light guide plate 43 is disposed in the accommodating portion 411 and has a light exiting surface 431. The optical film set 44 is disposed in the accommodating portion 411 and on the light exiting surface 431 of the light guide plate 43.

Accordingly the electrostatic releasing layer of the present disclosure can also release the accumulated electrostatic charges by electrically connecting to grounding units at different locations.

In Embodiment 2, the touch display device 200 comprises an electrostatic releasing layer 35 having a sheet resistance in a range from $10^9$ to $10^{12}\Omega/\square$ being electrically connected to a grounding unit 312. As a result, the accumulated electrostatic charges can then be released using the electrostatic releasing layer 35. The sensitivity and accuracy of the touch control of the device can then be improved. Since the first polarizer 34 includes a protruding portion 341 and the electrostatic releasing layer 35 has stickiness; thus, the electrostatic releasing layer 35 can be electrically connected to the grounding unit 312 on the first substrate 31 directly. No additional manufacturing processes and elements are used to electrically connect the electrostatic releasing layer 35 to the grounding unit 312. Consequently, the manufacturing process of the touch display panel can be overall simplified. Product yield can then be increased.

Other compositions, constituents, and arrangements of Embodiment 2 are similar to Embodiment 1. Therefore, their descriptions will not be repeated here again.

Embodiment 3

Figure 2B:
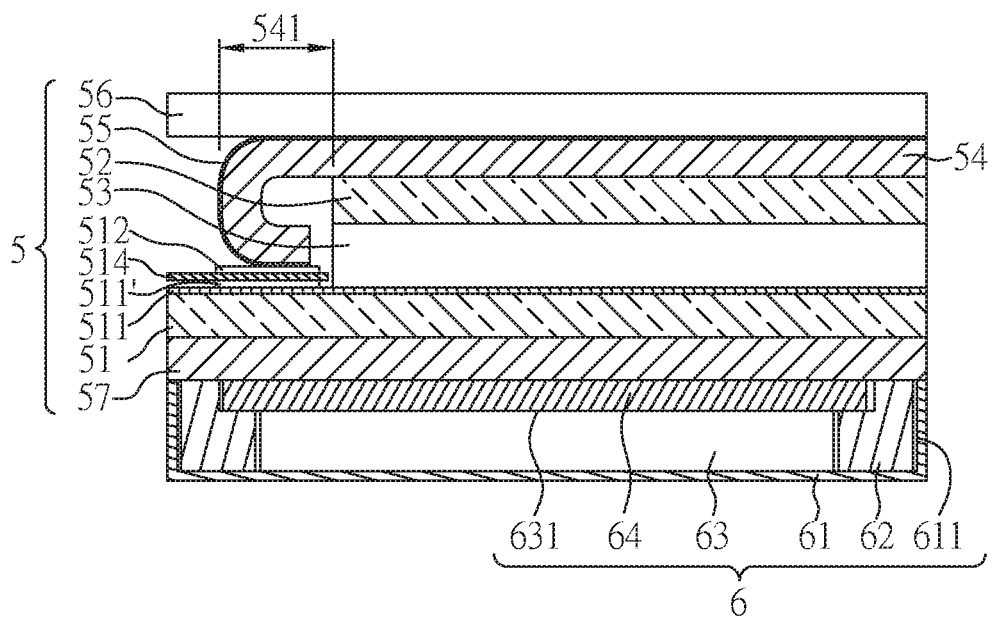
FIG. 2B is a schematic diagram showing a side view of a touch display device of an embodiment of the present disclosure.

Please refer to FIG. 2B. FIG. 2B is a schematic diagram showing a side view of a touch display device 300 of Embodiment 3 of the present disclosure. Embodiment 3 is similar to Embodiment 2. As shown in FIG. 2B, the difference is that the electrostatic releasing layer 55 of Embodiment 3 is disposed on another surface of the first polarizer 54. Specifically, the electrostatic releasing layer 55 is disposed on a surface of the first polarizer 54 facing the cover glass 56. Through a different bending and folding method, a least one portion of the electrostatic releasing layer 55 on the protruding portion 541 is electrically connected to the grounding unit 512. Hence, the touch display device 300 of Embodiment 3 can have similar effect as that of the touch display device 200 of Embodiment 2.

As shown in FIG. 2B, the touch display device 300 of Embodiment 3 comprises a touch display panel 5 and a backlight module 6. The touch display panel 5 is disposed on the backlight module 6. The touch display panel 5 of Embodiment 3 comprises: a first substrate 51; a second substrate 52 disposed opposite to the first substrate 51; a display medium layer 53 disposed between the first substrate 51 and the second substrate 52, and it is a liquid crystal layer; a sensing electrode layer 511 disposed on the first substrate 51, and the sensing electrode layer 511 comprises a common electrode (not shown) and a pixel electrode (not shown); a flexible printed circuit 514 disposed on the first substrate 51, and the flexible printed circuit 514 is electrically connected the common electrode through a connecting pad 511'; a grounding unit 512 disposed on the flip chip-on film 514; a first polarizer 54 disposed on the second substrate 52 and comprises a protruding portion 541 connected to the grounding unit 512; an electrostatic releasing layer 55 disposed on two surfaces of the first polarizer 54, and a sheet resistance of the electrostatic releasing layer 55 is $10^9$-$10^{12}\Omega/\square$; a cover glass 56 disposed on the second substrate 52, and the first polarizer 54 and the electrostatic releasing layer 55 are disposed between the cover glass 56 and the second substrate 52; and a second polarizer 57 disposed on the first substrate 51. At least one portion of the electrostatic releasing layer 55 on the protruding portion 541 abuts both the protruding portion 541 and the grounding unit 512. Similar to Embodiment 2, the backlight module 6 of Embodiment 3 comprises: a frame body 61, a plurality of frame strips 62, a light guide plate 63, and an optical film set 64. The frame body 61 has an accommodating portion 611. The frame strips 62 are disposed along and surround sides of the accommodating portion 611. The light guide plate 63 is disposed in the accommodating portion 611 and has a light exiting surface 631. The optical film set 64 is disposed in the accommodating portion 611 and on the light exiting surface 631 of the light guide plate 63.

Accordingly, the electrostatic releasing layer of the present disclosure can also release the accumulated electrostatic charges by electrically connecting to grounding units at different locations.

In Embodiment 3, the touch display device 300 comprises an electrostatic releasing layer 55 having a sheet resistance in a range from $10^9$ to $10^{12}\Omega/\square$ being electrically connected to a grounding unit 512. As a result, the accumulated electrostatic charges can then be released using the electrostatic releasing layer 55. The sensitivity and accuracy of the touch control of the device can then be improved. Since the first polarizer 54 includes a protruding portion 541 and the electrostatic releasing layer 55 has stickiness; thus, the electrostatic releasing layer 55 can be electrically connected to the grounding unit 512 on the first substrate 51 directly. No additional manufacturing processes and elements are used to electrically connect the electrostatic releasing layer 55 to the grounding unit 512. Consequently, the manufacturing process of the touch display panel can be overall simplified. Product yield can then be increased.

Other compositions, constituents, and arrangements of Embodiment 3 are similar to Embodiment 2. Therefore, their descriptions will not be repeated here again.

Embodiment 4

Figure 3:
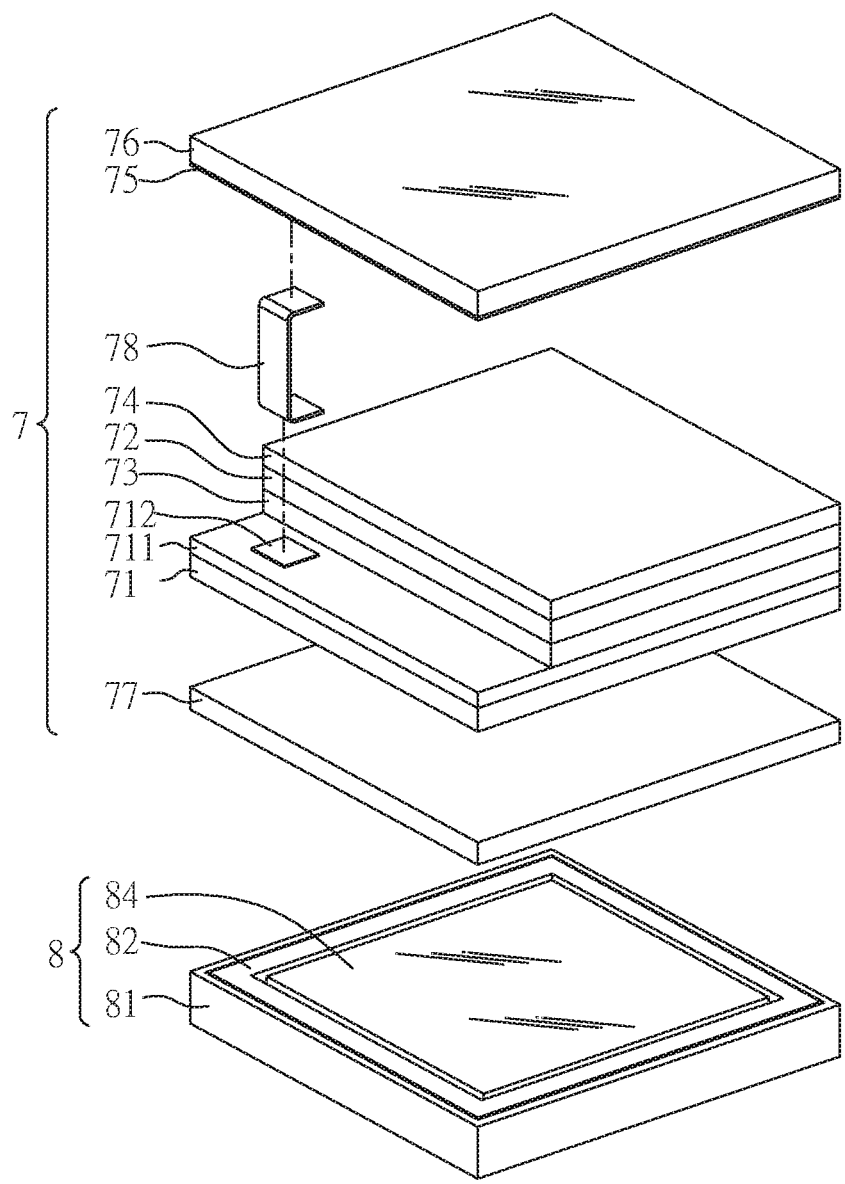
FIG. 3 is a three-dimensional schematic diagram of a touch display device of an embodiment of the present disclosure.

Please refer to FIG. 3. FIG. 3 is a three-dimensional schematic diagram of a touch display device 400 of Embodiment 4 of the present disclosure. Embodiment 4 is similar to Embodiment 1 in general. The differences are in the arrangement of the electrostatic releasing layer and its connection to the grounding unit. Specifically, the electrostatic releasing layer 74 of Embodiment 4 is formed by plating (i.e. vapor deposition, sputtering, etc.) the aforesaid inorganic materials (i.e. ITO, IZO) on a surface of the cover glass 76 facing the first polarizer 74. The electrostatic releasing layer 75 is then electrically connected to the grounding unit 712 through a conductive tape 78. However, in other embodiments of the present disclosure, the electrostatic releasing layer 75 may also form by plating on a surface of the second substrate 72 facing the first polarizer 74.

As shown in FIG. 3, the touch display device 400 of Embodiment 4 comprises a touch display panel 7 and a backlight module 8. The touch display panel 7 is disposed on the backlight module 8. The touch display panel 7 of Embodiment 4 comprises: a first substrate 71; a second substrate 72 disposed opposite to the first substrate 71; a display medium layer 73 disposed between the first substrate 71 and the second substrate 72, and it is a liquid crystal layer; a sensing electrode layer 711 disposed on the first substrate 71, and the sensing electrode layer 711 comprises a common electrode (not shown) and a pixel electrode (not shown); a grounding unit 712 disposed on the first substrate 71 and electrically connected to the common electrode; a first polarizer 74 disposed on the second substrate 72; an electrostatic releasing layer 75 disposed above the first polarizer 74, a sheet resistance of the electrostatic releasing layer 75 is $10^9$-$10^{12}\Omega/\square$, and a thickness of the electrostatic releasing layer 75 is 10-100 Å; a cover glass 76 disposed on the second substrate 72, and the first polarizer 74 and the electrostatic releasing layer 75 are disposed between the cover glass 76 and the second substrate 72; and a second polarizer 77 disposed on the first substrate 71. The electrostatic releasing layer 75 is electrically connected to the grounding unit 712 through a conductive tape 78. The backlight module 8 of Embodiment 4 is the same as that of Embodiment 1. Therefore, its description will not be repeated here again.

Other compositions, constituents, and arrangements of Embodiment 4 are similar to Embodiment 1. Therefore, their descriptions will not be repeated here again as well.

Accordingly, in Embodiment 4, the touch display device 400 comprises an electrostatic releasing layer 75 having a sheet resistance in a range from $10^9$ to $10^{12}\Omega/\square$ being electrically connected to a grounding unit 712. As a result, the accumulated electrostatic charges can then be released using the electrostatic releasing layer 75. The sensitivity and accuracy of the touch control of the device can then be improved.

Embodiment 5

Figure 4:
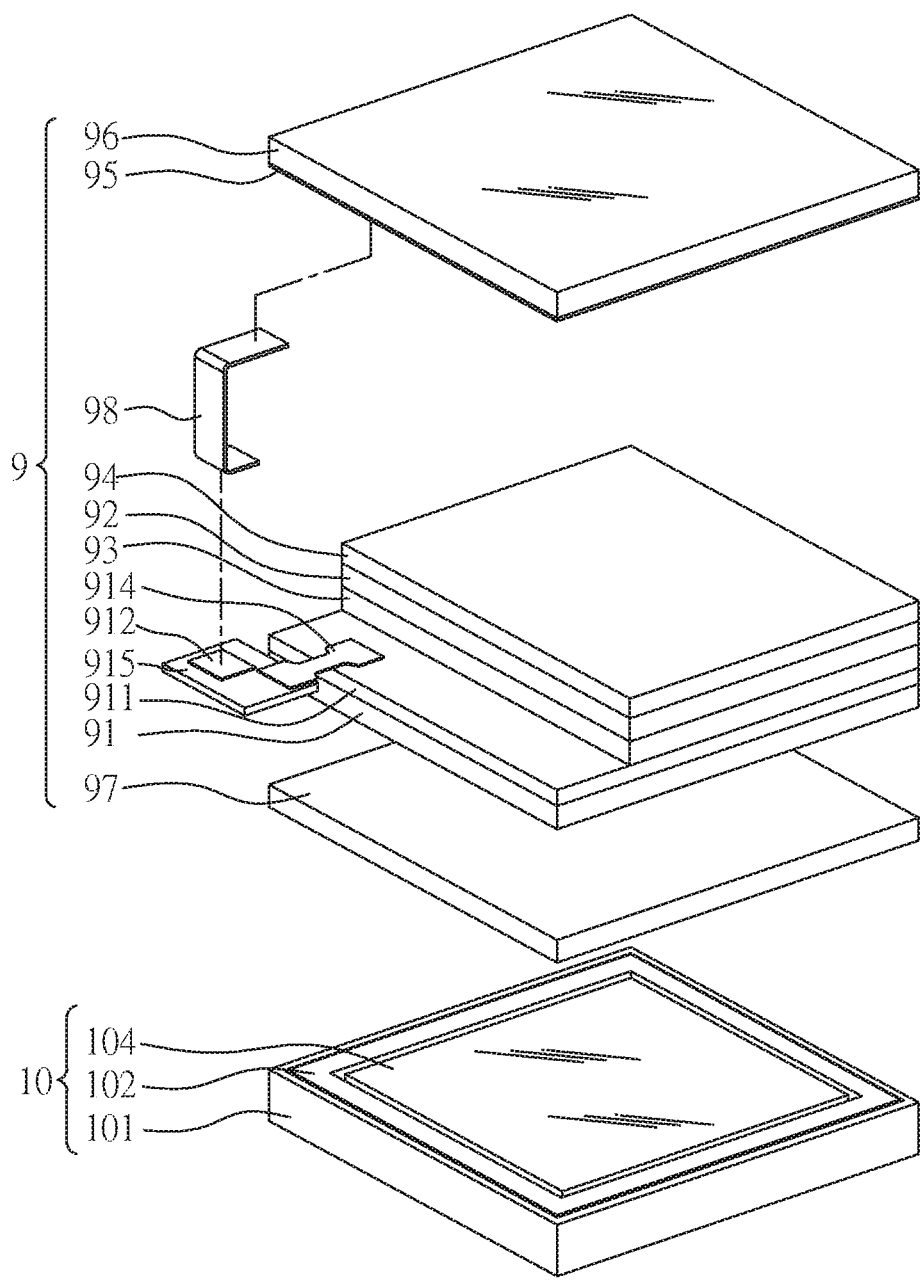
FIG. 4 is a three-dimensional schematic diagram of a touch display device of an embodiment of the present disclosure.

Please refer to FIG. 4. FIG. 4 is a three-dimensional schematic diagram of a touch display device 500 of Embodiment 5 of the present disclosure. Embodiment 5 is similar to Embodiment 4 in general. The difference is that the grounding units that the electrostatic releasing layer is electrically connected to are at different locations in Embodiments 4 and 5. Specifically, the grounding unit of Embodiment 5 is disposed on a printed circuit board.

As shown in FIG. 4, the touch display device 500 of Embodiment 5 comprises a touch display panel 9 and a backlight module 10. The touch display panel 9 is disposed on the backlight module 10. The touch display panel 9 of Embodiment 5 comprises: a first substrate 91; a second substrate 92 disposed opposite to the first substrate 91; a display medium layer 93 disposed between the first substrate 91 and the second substrate 92, and it is a liquid crystal layer; a sensing electrode layer 911 disposed on the first substrate 91, and the sensing electrode layer 911 comprises a common electrode (not shown) and a pixel electrode (not shown); a flexible printed circuit 914 disposed on the first substrate 91; a printed circuit board 915 electrically connected to the common electrode through the flexible printed circuit 914 and electrically connected to the first substrate 91 through the flexible printed circuit 914 and the common electrode of the sensing electrode layer 911; a grounding unit 912 disposed on the printed circuit board 915; a first polarizer 94 disposed on the second substrate 92; an electrostatic releasing layer 95 disposed above the first polarizer 94, and a sheet resistance of the electrostatic releasing layer 95 is $10^9$-$10^{12}\Omega/\square$; a cover glass 96 disposed on the second substrate 92, and the first polarizer 94 and the electrostatic releasing layer 95 are disposed between the cover glass 96 and the second substrate 92; and a second polarizer 97 disposed on the first substrate 91. The electrostatic releasing layer 95 is electrically connected to the grounding unit 912 through a conductive tape 98. The backlight module 10 of Embodiment 5 is the same as that of Embodiment 4. Therefore, its description will not be repeated here again.

Accordingly, in Embodiment 5, the touch display device 500 comprises an electrostatic releasing layer 95 having a sheet resistance in a range from $10^9$ to $10^{12}\Omega/\square$ being electrically connected to a grounding unit 912. As a result, the accumulated electrostatic charges can then be released using the electrostatic releasing layer 95. The sensitivity and accuracy of the touch control of the device can then be improved.

Embodiment 6

Figure 5:
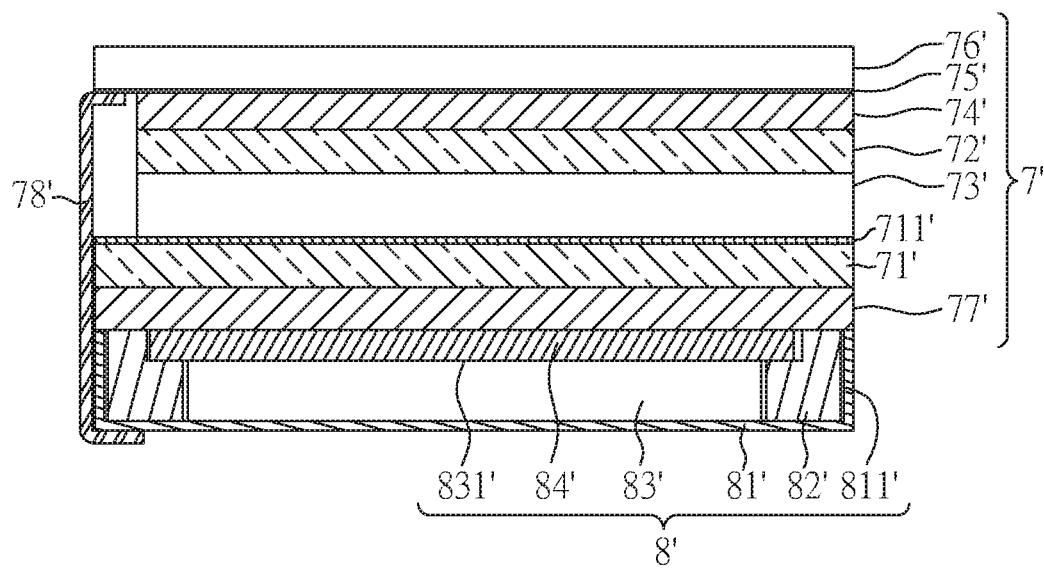
FIG. 5 is a schematic diagram showing a side view of a touch display device of an embodiment of the present disclosure.

Please refer to FIG. 5. FIG. 5 is a schematic diagram showing a side view of a touch display device 600 of Embodiment 6 of the present disclosure. Embodiment 6 is similar to Embodiment 4 in general. The difference is that the frame body of the backlight module of Embodiment 6 is a metal product, serving as a grounding unit to be electrically connected to the electrostatic releasing layer.

As shown in FIG. 5, the touch display device 600 of Embodiment 6 comprises a touch display panel 7' and a backlight module 8'. The touch display panel 7' is disposed on the backlight module 8'. The touch display panel 7' of Embodiment 6 comprises: a first substrate 71', a second substrate 72', a sensing electrode layer 711', a display medium layer 73', a first polarizer 74', an electrostatic releasing layer 75', a cover glass 76', and a second polarizer 77'. The second substrate 72' is disposed opposite to the first substrate 71'. The sensing electrode layer 711' and the display medium layer 73' are disposed between the first substrate 71' and the second substrate 72'. The first polarizer 74' is disposed on the second substrate 72'. The electrostatic releasing layer 75' is disposed above the first polarizer 74' and a sheet resistance of the electrostatic releasing layer 75' is $10^9$-$10^{12}\Omega/\square$. The cover glass 76' is disposed on the electrostatic releasing layer 75'. The second polarizer 77' is disposed on a side of the first substrate 71' opposite to another side of the first substrate 71' facing the display medium layer 73'. The backlight module 8' of Embodiment 6 comprises: a metal frame body 81', a plurality of frame strips 82', a light guide plate 83', and an optical film set 84'. The metal frame body 81' has an accommodating portion 811'. The frame strips 82' are disposed along and surround sides of the accommodating portion 811'. The light guide plate 83' is disposed in the accommodating portion 811' and has a light exiting surface 831'. The optical film set 84' is disposed in the accommodating portion 811' and on the light exiting surface 831' of the light guide plate 83'. The electrostatic releasing layer 75' is electrically connected to the metal frame body 81' through a conductive tape 78'.

In the present embodiment, the metal frame body 81' is a metal product made of aluminum or iron. However, other known metals commonly used to prepare the frame bodies of backlight modules in the art may also be used. The present disclosure is not limited thereto.

Accordingly, in Embodiment 6, the touch display device 600 comprises an electrostatic releasing layer 75' having a sheet resistance in a range from $10^9$ to $10^{12}\Omega/\square$ being electrically connected to the metal frame body 81', which serves as a grounding unit. As a result, the accumulated electrostatic charges can then be released using the electrostatic releasing layer 75'. The sensitivity and accuracy of the touch control of the device can then be improved.

Embodiment 7

Figure 6:
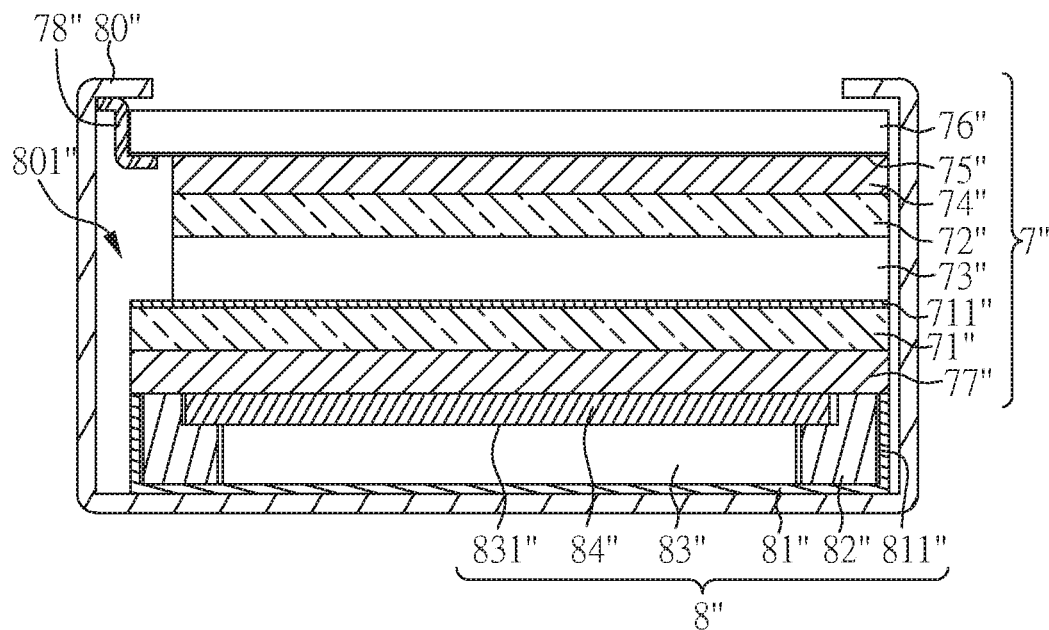
FIG. 6 is a schematic diagram showing a side view of a touch display device of an embodiment of the present disclosure.

Please refer to FIG. 6. FIG. 6 is a schematic diagram showing a side view of a touch display device 700 of Embodiment 7 of the present disclosure. Embodiment 7 is similar to Embodiment 6 in general. The difference is that the metal housing, which accommodates the touch display panel and the backlight module, serves as a grounding unit to be electrically connected to the electrostatic releasing layer in Embodiment 7. The accumulated electrostatic charges are then released.

As shown in FIG. 6, the touch display device 700 of Embodiment 7 comprises a metal housing 80" having an accommodating space 801"; a backlight module 8" disposed in the accommodating space 801"; and a touch display panel 7" disposed in the accommodating space 801" and on the backlight module 8". The backlight module 8" of Embodiment 7 comprises: a frame body 81", a plurality of frame strips 82", a light guide plate 83", and an optical film set 84". The frame body 81" has an accommodating portion 811". The frame strips 82" are disposed along and surround sides of the accommodating portion 811". The light guide plate 83" is disposed in the accommodating portion 811" and has a light exiting surface 831". The optical film set 84" is disposed in the accommodating portion 811" and on the light exiting surface 831" of the light guide plate 83". The touch display panel 7" of Embodiment 7 comprises: a first substrate 71", a second substrate 72", a sensing electrode layer 711", a display medium layer 73", a first polarizer 74", an electrostatic releasing layer 75", a cover glass 76", and a second polarizer 77". The second substrate 72" is disposed opposite to the first substrate 71". The sensing electrode layer 711" and the display medium layer 73" are disposed between the first substrate 71" and the second substrate 72". The first polarizer 74" is disposed on the second substrate 72". The electrostatic releasing layer 75" is disposed on the first polarizer 74" and a sheet resistance of the electrostatic releasing layer 75" is $10^9$-$10^{12}\Omega/\square$. The cover glass 76" is disposed on the electrostatic releasing layer 75". The second polarizer 77" is disposed on a side of the first substrate 71" opposite to another side of the first substrate 71' facing the display medium layer 73". The metal housing 80" is electrically connected to the electrostatic releasing layer 75" through a conductive tape 78".

In the present embodiment, the metal housing 80" is a metal product made of iron. However, other known metals commonly used to prepare the housings of display devices in the art may also be used. The present disclosure is not limited thereto.

Accordingly, in Embodiment 7, the touch display device 700 comprises an electrostatic releasing layer 75" having a sheet resistance in a range from $10^9$ to $10^{12}\Omega/\square$ being electrically connected to the metal housing 80", which serves as a grounding unit. As a result, the accumulated electrostatic charges can then be released using the electrostatic releasing layer 75". The sensitivity and accuracy of the touch control of the device can then be improved.

Although the present disclosure has been explained in relation to its preferred embodiments, it is to be understood that the spirit and scope of the present disclosure is as hereinafter claimed and not limited to the embodiments described above.

What is claimed is:

1. A touch display panel, comprising:
   a first substrate;
   a second substrate disposed opposite to the first substrate;
   a display medium layer disposed between the first substrate and the second substrate;
   a sensing electrode layer disposed on the first substrate; and
   an electrostatic releasing layer disposed on the second substrate and a sheet resistance of the electrostatic releasing layer is $10^9$-$10^{12}\Omega/\square$.

2. The touch display panel as claimed in claim 1, further comprising a grounding unit disposed on the first substrate and electrically connected to the electrostatic releasing layer.

3. The touch display panel as claimed in claim 2, further comprising a first polarizer disposed on the second substrate, wherein the electrostatic releasing layer is disposed on at least one surface of the first polarizer.

4. The touch display panel as claimed in claim 3, further comprising a cover glass disposed on the second substrate, wherein the electrostatic releasing layer and the first polarizer are disposed between the second substrate and the cover glass.

5. The touch display panel as claimed in claim 3, wherein the first polarizer includes a protruding portion connected to the grounding unit.

6. The touch display panel as claimed in claim 2, wherein the sensing electrode layer includes a common electrode electrically connected to the grounding unit.

7. The touch display panel as claimed in claim 6, further comprising a flexible printed circuit disposed on the first substrate and electrically connected to the common electrode, and the grounding unit is disposed on the flexible printed circuit.

8. The touch display panel as claimed in claim 7, further comprising a printed circuit board, wherein the flexible printed circuit connects the first substrate and the printed circuit board, and the grounding unit is disposed on the printed circuit board.

9. The touch display panel as claimed in claim 2, wherein the grounding unit is electrically connected with the electrostatic releasing layer through a conductive tape.

10. The touch display panel as claimed in claim 1, wherein the electrostatic releasing layer comprises conductive polymer, transparent conductive oxide, metal, carbon nanotube, graphene, or a combination thereof.

11. A touch display device, comprising:
- a backlight module, wherein the backlight module includes a metal frame body, a light guide plate, and an optical film set, the metal frame body has an accommodating portion, the light guide plate is disposed in the accommodating portion and has a light exiting surface, and the optical film set is disposed on the light exiting surface of the light guide plate; and
- a touch display panel disposed on the backlight module, wherein the touch display panel includes a first substrate, a second substrate, a sensing electrode layer, a display medium layer, and a electrostatic releasing layer, the second substrate is disposed opposite to the first substrate, the sensing electrode layer and the display medium layer are disposed between the first substrate and the second substrate, and the electrostatic releasing layer is disposed on the second substrate and a sheet resistance of the electrostatic releasing layer is $10^9$-$10^{12}\Omega/\square$.

12. The touch display device as claimed in claim 11, wherein the metal frame body electrically connects to the electrostatic releasing layer.

13. The touch display device as claimed in claim 11, wherein the electrostatic releasing layer comprises conductive polymer, transparent conductive oxide, metal, carbon nanotube, graphene, or a combination thereof.

14. The touch display panel as claimed in claim 11, further comprising a grounding unit and a conductive tape, wherein the grounding unit is electrically connected with the electrostatic releasing layer through the conductive tape.

15. A touch display device, comprising:
- a metal housing having an accommodating space;
- a backlight module disposed in the accommodating space; and
- a touch display panel disposed in the accommodating space and on the backlight module, wherein the touch display panel includes a first substrate, a second substrate, a sensing electrode layer, a display medium layer, and a electrostatic releasing layer, the second substrate is disposed opposite to the first substrate, the sensing electrode layer and the display medium layer are disposed between the first substrate and the second substrate, and the electrostatic releasing layer is disposed on the second substrate and a sheet resistance of the electrostatic releasing layer is $10^9$-$10^{12}\Omega/\square$.

16. The touch display device as claimed in claim 15, wherein the metal housing electrically connects to the electrostatic releasing layer.

17. The touch display device as claimed in claim 15, wherein the electrostatic releasing layer comprises conductive polymer, transparent conductive oxide, metal, carbon nanotube, graphene, or a combination thereof.

\* \* \* \* \*